US012571727B2

(12) United States Patent (10) Patent No.: US 12,571,727 B2
Rimbert-Riviere et al. (45) Date of Patent: Mar. 10, 2026

(54) APPARATUS COMPRISING INFRARED CAMERAS AND A TEMPERATURE SOURCE AND METHOD FOR DETECTING CRACKS IN SAMPLES BY INFRARED RADIATION

(71) Applicant: Infineon Technologies AG, Neubiberg (DE)

(72) Inventors: Charles Rimbert-Riviere, Soest (DE); Simon Kornprobst, Stephanskirchen (DE); Soumya Susovita Nayak, Munich (DE); Ernst-Roland Sittner, Warstein (DE)

(73) Assignee: Infineon Technologies AG, Neubiberg (DE)

( * ) Notice: Subject to any disclaimer, the term of this patent is extended or adjusted under 35 U.S.C. 154(b) by 429 days.

(21) Appl. No.: 17/945,425

(22) Filed: Sep. 15, 2022

(65) Prior Publication Data

US 2023/0086591 A1 Mar. 23, 2023

(30) Foreign Application Priority Data

Sep. 22, 2021 (DE) .......................... 102021124565.6

(51) Int. Cl.
| | |
|---|---|
| *G01N 21/3563* | (2014.01) |
| *G01N 21/74* | (2006.01) |
| *G01N 25/72* | (2006.01) |

(52) U.S. Cl.
CPC ......... *G01N 21/3563* (2013.01); *G01N 21/74* (2013.01); *G01N 25/72* (2013.01); *G01N 2021/3572* (2013.01); *G01N 2021/745* (2013.01)

(58) Field of Classification Search
CPC .............. G01N 21/35; G01N 21/3563; G01N 2021/3568; G01N 2021/3572; G01N 21/74; G01N 2021/745; G01N 25/72
USPC ...................................................... 250/339.14
See application file for complete search history.

(56) References Cited

U.S. PATENT DOCUMENTS

| | | | | |
|---|---|---|---|---|
| 6,013,915 A | * | 1/2000 | Watkins ................. | G01N 25/72 |
| | | | | 250/341.7 |
| 6,567,541 B1 | * | 5/2003 | Van .......................... | G01N 3/60 |
| | | | | 382/145 |
| 6,730,912 B2 | * | 5/2004 | Sun ........................ | G01N 25/72 |
| | | | | 250/341.1 |

(Continued)

FOREIGN PATENT DOCUMENTS

| | | |
|---|---|---|
| CN | 111505052 A | 8/2020 |
| JP | 2003207472 A | 7/2003 |

(Continued)

*Primary Examiner* — Allen C. Ho
(74) *Attorney, Agent, or Firm* — Murphy, Bilak & Homiller, PLLC

(57) ABSTRACT

An apparatus for detecting cracks in a plurality of samples includes: a temperature source configured to heat or cool a section of the samples; one or more infrared cameras positioned near one or both sides of the samples and configured to receive infrared image data from the samples; a data acquisition and processing unit configured to generate a two-dimensional image out of the infrared image data to detect cracks in the samples; and a conveyor unit configured to transport the samples past the temperature source and the one or more infrared cameras.

10 Claims, 3 Drawing Sheets

(56)                    References Cited

U.S. PATENT DOCUMENTS

| | | | | |
|---|---|---|---|---|
| 6,874,932 B2 * | 4/2005 | Devitt | .................... | G01N 25/72 |
| | | | | 250/341.6 |
| 7,129,492 B2 * | 10/2006 | Saito | ..................... | G01N 25/72 |
| | | | | 250/341.6 |
| 7,220,966 B2 * | 5/2007 | Saito | ..................... | G01N 25/72 |
| | | | | 250/341.1 |
| 8,006,566 B2 * | 8/2011 | Sopori | .............. | G01N 21/9505 |
| | | | | 73/777 |
| 9,212,099 B2 * | 12/2015 | Sun | ..................... | C04B 41/0072 |
| 9,494,468 B2 * | 11/2016 | Wolfgruber | ............ | G01N 25/72 |
| 9,905,014 B2 * | 2/2018 | Heissenstein | ............. | G01J 5/02 |
| 10,706,525 B2 * | 7/2020 | Diao | ................... | G06T 7/0004 |
| 10,733,723 B2 * | 8/2020 | Diao | ........................ | G06T 7/10 |
| 10,794,889 B2 * | 10/2020 | Shelton | ............. | G01N 21/3563 |
| 11,031,556 B2 * | 6/2021 | Chen | ................. | H01L 21/67248 |
| 11,306,016 B2 * | 4/2022 | Dalstra | ................. | G01N 21/90 |

FOREIGN PATENT DOCUMENTS

| | | | | | |
|---|---|---|---|---|---|
| JP | 2006177892 A | 7/2006 | | | |
| JP | 2013061202 A | 4/2013 | | | |
| WO | WO 2006/054962 A2 * | 5/2006 | ................ | B60J 9/00 |
| WO | WO 2018/064104 A1 * | 4/2018 | ............ | G01N 25/72 |

* cited by examiner

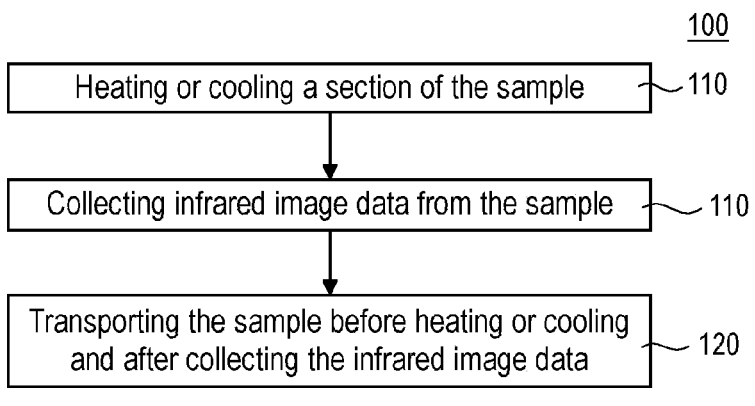

100

Heating or cooling a section of the sample ⌐110

Collecting infrared image data from the sample ⌐110

Transporting the sample before heating or cooling and after collecting the infrared image data ⌐120

Fig. 7

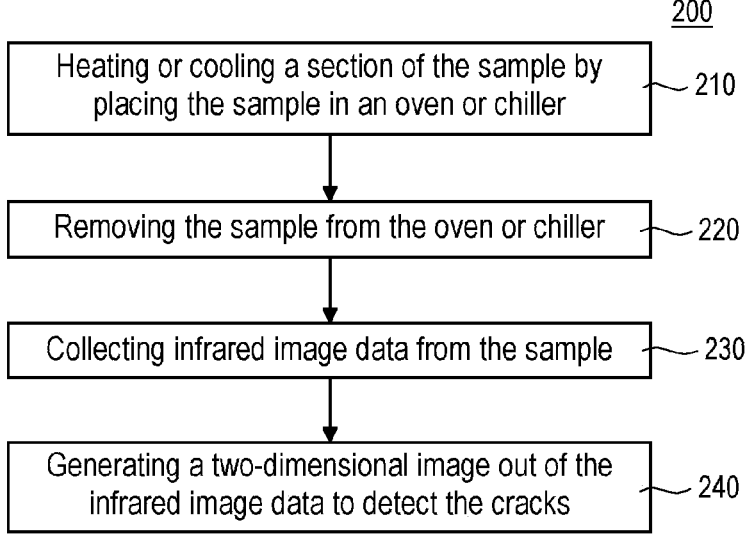

200

Heating or cooling a section of the sample by placing the sample in an oven or chiller ⌐210

Removing the sample from the oven or chiller ⌐220

Collecting infrared image data from the sample ⌐230

Generating a two-dimensional image out of the infrared image data to detect the cracks ⌐240

Fig. 8

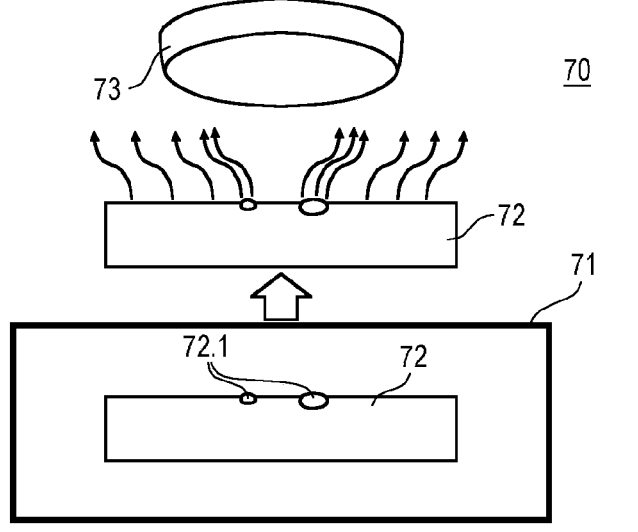

APPARATUS COMPRISING INFRARED CAMERAS AND A TEMPERATURE SOURCE AND METHOD FOR DETECTING CRACKS IN SAMPLES BY INFRARED RADIATION

TECHNICAL FIELD

The present disclosure is related to an apparatus and a method for detecting cracks in one or more samples.

BACKGROUND

Ceramic substrates play an important role in the semiconductor industry as they guarantee the dielectric insulation of the semiconductor device, in particular the semiconductor power device. Any defects in the ceramic substrate are a potential risk of dielectric breakthrough which means that avoiding and/or detecting the defects is of utmost importance.

The Scanning Acoustic Microscopy (SAM) is a technology which uses focused sound to investigate, measure, or image an object. It is commonly used in failure analysis and non-destructive evaluation. However, one major disadvantage of this solution is that the sample has to be in contact with a coupling medium (generally water), which can be a potential source of contamination, metal oxidation, or any other impairments which may come up during the measuring process.

Another detection method involves a high voltage test to screen the raw ceramic after sintering. A high voltage is applied between two electrodes which is passed by an operator over the sample. Once it goes over a defect, a breakthrough will be provoked thus making the ceramic unusable. The sensitivity of this test is not very high, and it destroys the ceramic resulting in a yield loss.

For these and other reasons there is a need for the present disclosure.

SUMMARY

A first aspect of the present disclosure is related to an apparatus for detecting cracks in one or more samples, comprising a temperature source configured to heat or cool a section of the sample, one or more infrared cameras positioned near one or both sides of the sample and configured to receive infrared image data from the sample, a data acquisition and processing unit configured to generate a two-dimensional image out of the infrared image data to detect the cracks, and a conveyor unit configured to transport the sample past the temperature source and the one or more infrared cameras.

A second aspect of the present disclosure is related to a heating or cooling the sample, collecting infrared image data from the sample, and transporting the sample before heating or cooling and after collecting the infrared image data.

A third aspect of the present disclosure is related to a method of detecting cracks in one or more samples, comprising heating or cooling the sample by placing the sample in an oven or chiller, removing the sample from the oven or chiller, collecting infrared image data from the sample, and generating a two-dimensional image out of the infrared image data to detect the cracks.

The one or more infrared camera measures the black body radiation emitted by the sample which depends on the temperature of the sample. The measurement principle is based on the higher thermal resistance of a crack which is typically filled with air. Accordingly heat transfer is reduced across the crack plane so a low temperature region will be formed behind the crack and detected by the IR imaging apparatus. On the other hand, if the back side of the ceramic is anchored to a fixed temperature, reduced heat flow (due to conductivity difference) will result in higher temperatures in the crack cut plane. If the sample is taken out from an oven, the larger surface area from the crack means higher dissipation to environment and lower temperature on the crack cut plane. The technique can be used for samples of various configurations and formed of various materials. In the present disclosure it is mostly intended to be used for ceramic substrates which are to be used in semiconductor devices.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

The elements of the drawings are not necessarily to scale relative to each other. Like reference numerals designate corresponding similar parts.

FIG. 7 shows a flow diagram for illustrating an exemplary method of detecting cracks in one or more samples by transporting the sample(s) past a temperature source and one or more infrared cameras.

FIG. 8 shows a flow diagram for illustrating an exemplary method of detecting cracks in one or more samples by heating or cooling the sample(s) in the convection mode in an oven or chiller and then examining the sample(s) with one or more infrared cameras.

FIG. 9 shows a schematic setup of an IR measurement in the convection mode where the sample is placed in an oven or chiller and thereafter the sample is examined by an infrared camera to detect the cracks.

DETAILED DESCRIPTION

In the following detailed description, reference is made to the accompanying drawings, which form a part hereof, and in which is shown by way of illustration specific embodiments in which the disclosure may be practiced. In this regard, directional terminology, such as "top", "bottom", "front", "back", "leading", "trailing", etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

It is to be understood that the features of the various exemplary embodiments described herein may be combined with each other, unless specifically noted otherwise.

As employed in this specification, the terms "bonded", "attached", "connected", "coupled" and/or "electrically connected/electrically coupled" are not meant to mean that the elements or layers must directly be contacted together; intervening elements or layers may be provided between the "bonded", "attached", "connected", "coupled" and/or "electrically connected/electrically coupled" elements, respectively. However, in accordance with the disclosure, the above-mentioned terms may, optionally, also have the specific meaning that the elements or layers are directly contacted together, i.e. that no intervening elements or layers are provided between the "bonded", "attached", "connected", "coupled" and/or "electrically connected/electrically coupled" elements, respectively.

Further, the word "over" used with regard to a part, element or material layer formed or located "over" a surface may be used herein to mean that the part, element or material layer be located (e.g. placed, formed, deposited, etc.) "indirectly on" the implied surface with one or more additional parts, elements or layers being arranged between the implied surface and the part, element or material layer. However, the word "over" used with regard to a part, element or material layer formed or located "over" a surface may, optionally, also have the specific meaning that the part, element or material layer be located (e.g. placed, formed, deposited, etc.) "directly on", e.g. in direct contact with, the implied surface.

Figure 1:
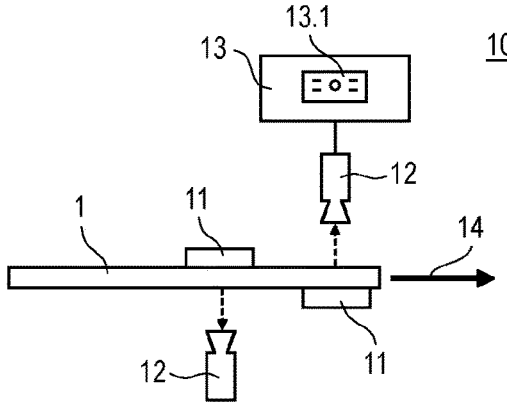
FIG. 1 shows a schematic setup of an IR measurement in the conduction mode where a heat source is connected with one surface of the sample and heat is conducted through the sample to the opposing surface and thereafter the sample is transported past an infrared camera to take IR image data from the sample.

FIG. 1 shows a schematic setup of an IR measurement in the conduction mode.

In particular, FIG. 1 shows an apparatus 10 for detecting cracks in one or more samples 1, the apparatus 10 comprising a heat source 11 configured to heat a section of the sample 1, two infrared cameras 12 positioned near both sides of the sample 1 and configured to receive infrared image data from the sample 1, a data acquisition and processing unit 13 configured to generate a two-dimensional image 13.1 out of the infrared image data to detect the cracks, and a conveyor unit 14 configured to transport the sample 1 past the heat source 11 and the infrared cameras 12.

The conveyor unit 14 is only symbolized by the arrow pointing to the right. A practical embodiment of the conveyor unit 14 could consist, for example, in any kind of a conveyor belt.

Instead of a heat source 11 also a cooling source could be used. It is only important to generate a temperature gradient between the sample 1 and the environment along the normal of the image plane. Accordingly, either a hot plate or a cold plate can be brought in direct contact with the sample 1.

According to an embodiment the sample 1 is a ceramic substrate 1, in particular made of, for example, Alumina (Al2O3), Aluminum nitride (AlN), or Beryllium oxide (BeO), but also other specimen can be examined by the apparatus 10.

The infrared camera 12 can be, for example, a conventional high-resolution and high-sensitivity infrared camera with 256×256 pixel focal plane array of infrared sensors. The data acquisition and processing unit 13 is connected with the one or more infrared cameras 12 for receiving and evaluating the thermal radiation data. The data acquisition and processing unit 13 can in particular be configured to perform first and second derivative data processing of measured temperature data from the infrared camera(s) 12 and to display two dimensional first and second derivative data image results on the display.

Figure 2:
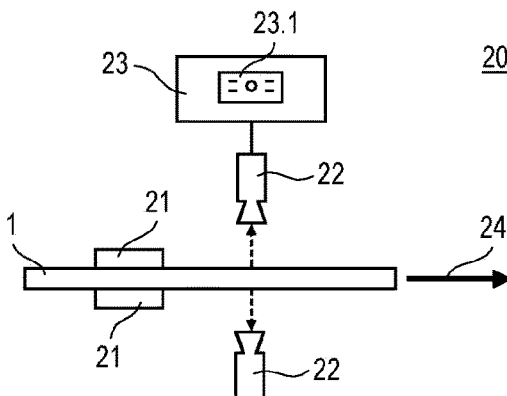
FIG. 2 shows a schematic setup of an IR measurement in the convection mode where the sample is heated or cooled in an oven or chiller and thereafter the sample is transported past an infrared camera to take IR image data from the sample.

FIG. 2 shows a schematic setup of an IR measurement in the convection mode.

In particular, FIG. 2 shows an apparatus 20 for detecting cracks in one or more samples 1, the apparatus 20 comprising an oven 21 configured to heat the sample 1, two infrared cameras 22 positioned near both sides of the sample 1 and configured to receive infrared image data from the sample 1, a processing unit 23 configured to generate a two-dimensional image 23.1 out of the infrared image data to detect the cracks, and a conveyor unit 24 configured to transport the sample 1 past the heat source 21 and the infrared cameras 22.

Again the conveyor unit 24 is only symbolized by the arrow pointing to the right. A practical embodiment of the conveyor unit 24 could consist, for example, of any kind of a conveyor belt.

The oven 21 can be configured in such a way that it comprises openings though which the sample 1 can be put into the oven 21 at a left side opening and removed out of the oven 21 at a right-side opening. Instead of an oven also a chiller can be used in which the sample 1 will be cooled.

It should be mentioned that each one of the features described in connection with the elements and units of the embodiment of FIG. 1 can also be applied to the embodiment of FIG. 2.

Figure 3:
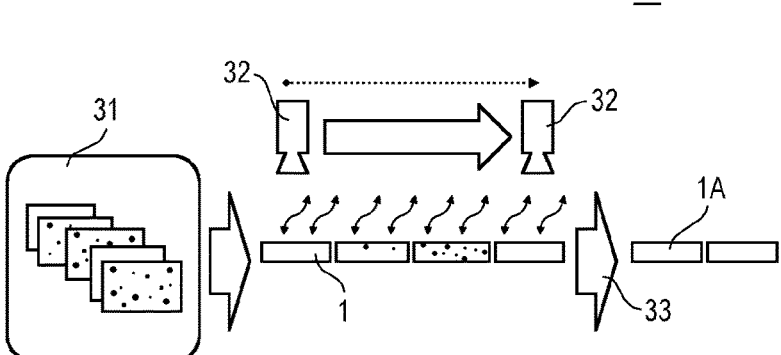
FIG. 3 shows a schematic representation of an IR measurement setup which is integrated in a production line containing a sintering oven for fabricating the ceramic samples.

FIG. 3 shows a schematic representation of an IR measurement setup which is integrated in a production line 30 containing a sintering oven 31 for fabricating the ceramic samples 1.

The production line 30 shown in FIG. 3 comprises a conventional sintering oven 31 which is used for carrying out the sintering process. The sintering process involves heating powder compacts to increase the product's mechanical strength and density. Sintering ovens 31 must be able to maintain heating temperatures below the product's melting point, as the goal is not to liquefy the material.

As shown in FIG. 3, the ceramic substrates 1 are taken out of the sintering oven 31 and thereafter cooled down while being transported past two or more IR cameras 32. In the embodiment as shown in FIG. 3 the infrared cameras 32 are on one and the same side of the moving samples 1. It is also possible to place one or more cameras 32 on one side and one or more cameras 32 on the other side of the moving samples 1. The cameras 32 are connected with a data acquisition and processing unit (not shown here) as was described in connection with the embodiments of FIGS. 1 and 2.

After evaluating the thermal data in the data acquisition and processing unit, the samples 1 are fed to a selection unit 33 which is here only symbolized by an arrow, and which will be described in a somewhat greater detail later below. Behind the selection unit 33 only those samples 1A are selected out for further processing which have been turned out to have a sufficiently low or even zero level of defect density.

It should further be mentioned that each one of the features described in connection with the elements and units of the embodiments of FIGS. 1 and 2 can also be applied to the embodiment of FIG. 3.

Figure 4:
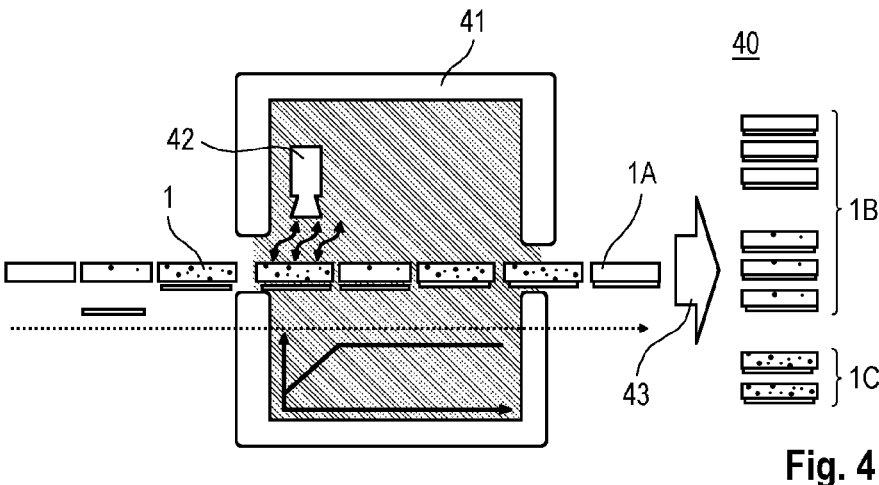
FIG. 4 shows a schematic representation of an IR measurement setup which is integrated in a production line containing a DCB oven for fabricating a pre-product for a DCB.

FIG. 4 shows a schematic representation of an IR measurement setup which is integrated in a production line 40 containing a DBC (direct bonded copper) oven 41 for fabricating a pre-product for a DBC.

Direct bonded copper (DBC) substrates are commonly used in semiconductor power modules because of their very good thermal conductivity. They are composed of a ceramic tile with a sheet of copper bonded to one or both sides by a high-temperature oxidation process. Under these conditions, a copper-oxygen eutectic forms which bonds successfully both to copper and the oxides used as substrates. The ceramic tile can be made of, for example, Alumina (Al2O3), Aluminum nitride (AlN), or Beryllium oxide (BeO).

From left to right in FIG. 4 the samples 1 are prefabricated by positioning a copper layer on one side of the ceramic substrate. Then the so prepared samples 1 are fed into a DBC oven 41 in which the copper layer is to be bonded to the ceramic substrate. An inset drawn into the oven shows a diagram of the temperature over the time showing a temperature ramp until a specific temperature is reached which is then held constant. The samples 1 are passed through the process chamber of the oven 41 with a velocity so that it is ensured that the copper layer is eutectically bonded to the ceramic substrate.

Examining the samples 1 with infrared cameras could be done as in the embodiment of FIG. 3, namely by removing the samples 1 out of the oven 41 and then placing the infrared cameras on one or both sides of the further track of the samples 1. However, in the embodiment as shown in FIG. 4 a different path was taken, namely by placing the infrared camera 42 inside the DCB oven 41. The embodiment shows only one camera 42 placed on the upper side of the samples 1 whilst also a further camera could be arranged on the lower side of samples 1. The camera 42 is connected with a data acquisition and processing unit (not shown here) as was described in connection with the embodiments of FIGS. 1 and 2.

The camera 42 is intentionally placed at the left end of the process chamber, so that the samples 1 are getting examined shortly after entering the process chamber where eutectic bonding of the copper layer to the ceramic substrate has not yet occurred. Only when approaching the right end of the process chamber the copper layer gets eutectically bonded to the ceramic substrate.

The samples 1A leaving the process chamber 41 are DCB substrates or pre-products of DCB substrates if it is intended to bond another copper layer to the opposing surface of the ceramic substrate. After evaluating the thermal data in the data acquisition and processing unit, the samples 1A are then fed to a selection unit 43 which is here only symbolized by an arrow and which will be described in a somewhat greater detail later below. Behind the selection unit 43 only those samples 1B are selected out for further processing which have been turned out to have a sufficiently low or even zero level of defect density. On the other hand, samples 1C are discarded in which an excessively high defect density could be detected.

Figure 5:
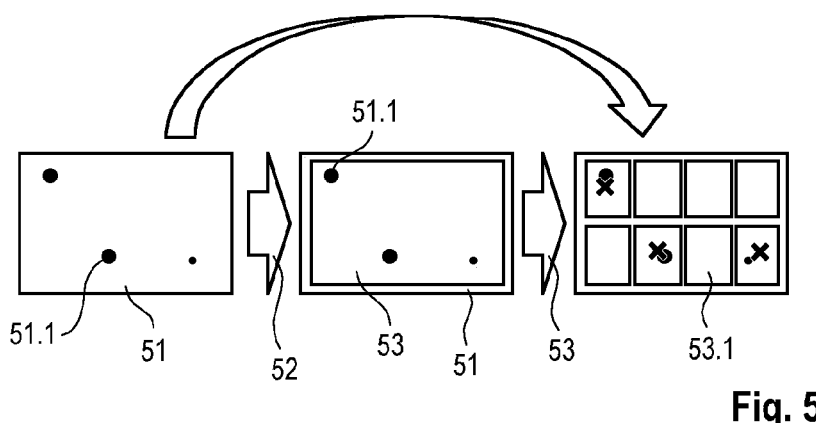
FIG. 5 shows top views of ceramic substrates for illustrating an example of a method for pre-selecting defect-free ceramic substrates.

FIG. 5 shows top views of a ceramic for illustrating an example of a method for pre-selecting defect-free ceramic substrates.

The ceramic 51 shown on the left of FIG. 5 is a raw or large-scale ceramic 51 which has already undergone an examination of defects by one of the methods as described before, wherein the identified defects 51.1 are indicated in the picture. The positions of the defects 51.1 are saved in the data acquisition and processing unit and will be used in the later selection process.

Thereafter a metallization of the large-scale ceramic 51 may be performed in order to fabricate a DCB or a pre-product of a DCB. The metallization is only symbolically indicated by the arrow 52. Accordingly, a metallization layer 53 of, for example, copper is deposited on one of the main surfaces of the large-scale ceramic 51 as shown in the middle picture of FIG. 5. The metallization can be performed in a DCB oven and it can be carried out after identifying the defects. Alternatively, it can be performed as was described in connection with FIG. 4, namely by means of an infrared camera placed in the DCB oven.

Thereafter an etching step will be performed in which streets are etched into the metallization layer 53 in order to obtain a plurality of metallization areas 53.1 each one of which is intended to become part of a small-scale DCB substrate. The etching is only symbolically indicated by the arrow 54.

The intermediate product shown on the right picture of FIG. 5 shows the large-scale ceramic 51 and the plurality of metallization areas 53.1 obtained after the etching. Now the saved data of the identified defects will be used again as indicated by the large arrow reaching from the left picture to the right picture of FIG. 5. They can be used now to identify those ceramic areas below the metallization areas 53.1 in which the defects are located. Depending on one or more of the number of defects, the density of the defects or the average size of the defects in these ceramics areas, an automatic decision can be made on whether or not these ceramic tiles should be discarded or not. In the present example three ceramic tiles have been symbolically crossed out to indicate that they will be discarded. Accordingly, the large-scale ceramic substrate will now be singulated into a plurality of small ceramic substrates, the crossed-out ceramic substrates will be discarded, and all the other ones can be further processed and can be incorporated into semiconductor modules.

Figure 6:
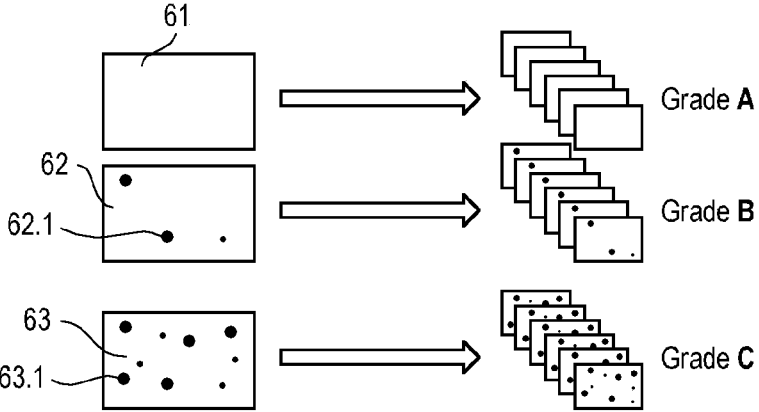
FIG. 6 shows top views of ceramic substrates for illustrating a method for classifying ceramic substrates according to their degree of defect density.

FIG. 6 shows top views of a ceramic for illustrating a method for classifying ceramic substrates according to their degree of defect density.

On the left-hand side of FIG. 6 three different types of raw or large-scale ceramics 61, 62 and 63 are shown which have already undergone an examination of defects by one of the methods as described above, wherein the identified defects 62.1 and 63.1 are indicated in the pictures. The ceramics 61, 62, 63 substrates are to be classified into 3 different classes, here called Grade A, Grade B, and Grade C, based on the defects identified in them, in particular one or more of defect density and size. The IR examination can take place at the beginning of the process or during incoming inspection. A software program of the data acquisition and processing unit automatically analyzes each one of the image data and gives a grade A, B or C on the basis of the defect density or the maximal defect size or a combination of both.

In the example as shown in FIG. 6, the uppermost ceramic 61 has shown to have a very low or even zero load of defects which will lead to a grade A classification. Such ceramics can thus also be called "perfect" for high end application, in particular for being incorporated into semiconductor modules. For grade A ceramics a process as described above in connection with FIG. 5 is not necessary. Instead, the large-scale ceramic can be singulated into a plurality of ceramic tiles which can be further processed directly.

The ceramic 62 of the middle picture corresponds to the one of FIG. 5 and has shown to have a medium load of defects which will lead to a grade B classification. Such ceramics can thus also be called "standard" for regular application. This means in particular that after singulating the raw ceramic 62 of grade B, the individual ceramic tiles can only be incorporated into semiconductor modules with low requirements, maybe with low or medium voltage semiconductor modules. If intended to be used in semiconductor modules with high requirements, in particular high voltage or power modules, a process as described above in connection with FIG. 5 is required which means that particular ceramic tiles with too high a load of defects must be sorted out.

Finally, the ceramic 63 of the lowermost picture has shown to have a high load of defects which will lead to a grade C classification. Such ceramics can thus also be called "low end" for less demanding low-cost applications. This means in particular that after singulating the raw ceramic 63 of grade C, the individual ceramic tiles cannot be incorporated into semiconductor modules with high requirements like, for example, high voltage or power modules. Normally only use in modules of low or medium voltage and power is possible.

FIG. 7 shows a flow diagram for illustrating an exemplary method of detecting cracks in one or more samples.

The method 100 of FIG. 7 comprises heating or cooling a section of the sample 110, collecting infrared image data from the sample 120, and transporting the sample before heating or cooling and after collecting the infrared image data 130.

According to an embodiment of the method 100, the one or more samples are transported to and from places where the heating or cooling and the collecting of infrared image data is done.

According to an embodiment of the method 100, performing heating or cooling is performed by bringing a hot plate or a cold plate in direct contact with the sample.

According to an embodiment of the method 100, performing heating or cooling is performed by placing the sample in an oven or chiller, and collecting the infrared image data after removing the sample from the oven or chiller.

According to an embodiment of the method 100, the sample is one or more of a ceramic substrate, an Al2O3 substrate, an AlN substrate, or a BeO substrate.

According to an embodiment of the method 100, the method further comprises placing a pre-product in a sinter oven for fabricating the ceramic substrate.

According to an embodiment of the method 100, the method further comprises placing the ceramic substrate in an oven for fabricating a direct copper bond substrate or a pre-product for a direct copper bond substrate from the supplied ceramic substrate.

According to an embodiment of the method 100, the method further comprises classifying the tested samples to several classes having different degrees of defects.

According to an embodiment of the method 100, the method further comprises selecting out the tested samples with a too high degree of defects.

It should further be mentioned that each one of the features described above in connection with any of the apparatuses of FIGS. 1 to 6 can also be applied to the method of FIG. 7.

FIG. 8 shows a flow diagram for illustrating an exemplary method of detecting cracks in one or more samples.

The method 200 according to FIG. 8 comprises heating or cooling the sample by placing the sample in an oven or chiller 210, removing the sample from the oven or chiller 220, collecting infrared image data from the sample 230, and generating a two-dimensional image out of the infrared image data to detect the cracks 240.

According to an embodiment of the method 200, the method further comprises transporting the sample before heating or cooling and after collecting the infrared image data, in particular transporting the sample to and from places where the heating or cooling and the collecting of infrared image data is done.

According to an embodiment of the method 200, wherein the sample is one or more of a ceramic substrate, an Al2O3 substrate, an AlN substrate, or a BeO substrate FIG. 9 shows a schematic setup of an IR measurement in the convection mode where the sample is placed in an oven or chiller and thereafter the sample is examined by an infrared camera to detect the cracks. This setup can be used to carry out the method described in connection with FIG. 8

In particular, the apparatus 70 of FIG. 9 shows a temperature source 71 which can be an oven or chiller. A sample 72 comprising defects 72.1 is placed in the temperature source 71 to be brought to a temperature T1. Thereafter the sample 72 is taken out of the temperature source 71 and held before an infrared camera 73. The infrared camera 73 is connected with a data acquisition and processing unit (not shown) and collects image data of the sample 72 and feeds the data to the data acquisition and processing unit.

The apparatus 70 may comprise further features which are described above in connection with the apparatus of FIG. 2.

In the following specific examples of the present disclosure are described.

Example 1 is an apparatus for detecting cracks in one or more samples, comprising a temperature source configured to heat or cool a section of the sample, one or more infrared cameras positioned near one or both sides of the sample and configured to receive infrared image data from the sample, a data acquisition and processing unit configured to generate a two-dimensional image out of the infrared image data to detect the cracks, and a conveyor unit configured to transport the sample past the temperature source and the one or more infrared cameras.

Example 2 is the apparatus according to Example 1, wherein the temperature source comprises a hot plate or a cold plate configured to be brought in direct contact with the sample.

Example 3 is the apparatus according to Example 1, wherein the temperature source comprises an oven or chiller configured to accommodate the sample.

Example 4 is the apparatus according to any one of Examples 1 to 3, wherein the sample is one or more of a ceramic substrate, an Al2O3 substrate, an AlN substrate, or a BeO substrate.

Example 5 is the apparatus according to Examples 3 and 4, wherein the temperature source is a sinter oven configured to fabricate the ceramic substrate.

Example 6 is the apparatus according to Examples 3 and 4, wherein the temperature source is an oven configured to fabricate a direct copper bond substrate or a pre-product for a direct copper bond substrate from the supplied ceramic substrate.

Example 7 is the apparatus according to Example 6, wherein the infrared camera is disposed inside the oven.

Example 8 is the apparatus according to any one of the preceding Examples, further comprising a classification unit configured to assign the tested samples to several classes having different degrees of defects.

Example 9 is the apparatus according to Example 8, further comprising a selection unit configured to select out the tested samples with a too high degree of defects.

Example 10 is a method of detecting cracks in one or more samples, comprising heating or cooling a section of the sample, collecting infrared image data from the sample, and transporting the sample before heating or cooling and after collecting the infrared image data.

Example 11 is the method according to Example 10, further comprising performing heating or cooling by bringing a hot plate or a cold plate in direct contact with the sample.

Example 12 is the method according to Example 10, further comprising performing heating or cooling by placing the sample in an oven or chiller, and collecting the infrared image data after removing the sample from the oven or chiller.

Example 13 is the method according to any one of Examples 10 to 12, wherein the sample is one or more of a ceramic substrate, an Al2O3 substrate, an AlN substrate, or a BeO substrate.

Example 14 is the method according to Example 12 and 13, further comprising placing a pre-product in a sinter oven for fabricating the ceramic substrate.

Example 15 is the method according to Examples 12 and 13, further comprising placing the ceramic substrate in an oven for fabricating a direct copper bond substrate or a pre-product for a direct copper bond substrate from the supplied ceramic substrate.

Example 16 is the method according to any one of Examples 10 to 15, further comprising classifying the tested samples to several classes having different degrees of defects.

Example 17 is the method according to any one of Examples 10 to 15, further comprising selecting out the tested samples with a too high degree of defects.

Example 18 is a method of detecting cracks in one or more samples, comprising heating or cooling the sample by placing the sample in an oven or chiller, removing the sample from the oven or chiller, collecting infrared image data from the sample, and generating a two-dimensional image out of the infrared image data to detect the cracks.

Example 19 is the method according to Example 18, further comprising transporting the sample before heating or cooling and after collecting the infrared image data.

Example 20 is the method according to Example 18 or 19, wherein the sample is one or more of a ceramic substrate, an Al2O3 substrate, an AlN substrate, or a BeO substrate.

In addition, while a particular feature or aspect of an embodiment of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the disclosure may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of detecting cracks in a plurality of samples, the method comprising:
heating or cooling a section of the plurality of samples;
collecting infrared image data from the plurality of samples; and
transporting each sample of the plurality of samples before heating or cooling the section of the plurality of samples and after collecting the infrared image data from the plurality of samples,
wherein the heating or the cooling the section of the plurality of samples is performed by bringing a hot plate or a cold plate in a direct contact with the plurality of samples.

2. The method of claim 1, further comprising:
performing the heating or the cooling the section of the plurality of samples by placing the plurality of samples in an oven or a chiller; and
collecting the infrared image data from the plurality of samples after removing the plurality of samples from the oven or the chiller.

3. The method of claim 1, wherein each sample of the plurality of is one or more of a ceramic substrate, an Al2O3 substrate, an AlN substrate, or a BeO substrate.

4. The method of claim 3, further comprising:
placing a pre-product in a sinter oven for fabricating a ceramic substrate.

5. The method of claim 3, further comprising:
placing a ceramic substrate in an oven for fabricating a direct copper bond substrate or a pre-product for a direct copper bond substrate from the ceramic substrate.

6. The method of claim 1, further comprising:
classifying the plurality of samples after testing to classes having different degrees of defects.

7. The method of claim 1, further comprising:
selecting out, after testing, each sample of the plurality of samples with a degree of defects above a threshold.

8. A method of detecting cracks in a plurality of samples, the method comprising:
heating or cooling the plurality of samples by placing the plurality of samples in an oven or a chiller;
removing the plurality of samples from the oven or the chiller;
collecting infrared image data from the plurality of samples; and
generating a two-dimensional image out of the infrared image data to detect cracks in the plurality of samples,
wherein each sample of the plurality of samples is a ceramic substrate, and
wherein the ceramic substrate is sintered in the oven during the heating the plurality of samples and before the collecting the infrared data from the plurality of samples.

9. The method of claim 8, further comprising:

transporting the plurality of samples before the heating or the cooling the plurality of samples and after the collecting the infrared image data from the plurality of samples.

10. The method of claim 8, wherein the ceramic substrate comprises an $Al_2O_3$ substrate, an AlN substrate, or a BeO substrate.

* * * * *